United States Patent [19]

Montemayor

[11] Patent Number: 5,318,312
[45] Date of Patent: Jun. 7, 1994

[54] PORTABLE FOLDING UTILITY CARRIER

[76] Inventor: Jesse Montemayor, 24231 Cheryl Kelton Pl., Newhall, Calif. 91321

[21] Appl. No.: 24,335

[22] Filed: Mar. 1, 1993

[51] Int. Cl.$^5$ .............................. B60F 3/00; B62B 3/02
[52] U.S. Cl. ...................................... 280/30; 280/32.5; 280/37; 280/87.01; 441/125
[58] Field of Search .................. 280/30, 32, 32.5, 32.6, 280/37, 641, 648, 87.01, 480; 114/267; 441/125

[56] References Cited

U.S. PATENT DOCUMENTS

| | | | |
|---|---|---|---|
| 546,993 | 10/1895 | Bigalow | 280/32.5 |
| 1,643,268 | 9/1927 | Burwatt | 280/32.6 |
| 2,487,706 | 11/1949 | Happ | 280/32.6 |
| 3,148,892 | 9/1964 | Merriott | 280/32.6 |
| 3,154,044 | 10/1964 | Bellas | 280/30 X |
| 4,647,056 | 3/1987 | Baker | 280/37 |
| 4,761,012 | 8/1988 | Dames | 280/37 X |
| 4,771,871 | 9/1988 | Lambracht | 280/37 X |
| 4,795,180 | 1/1989 | Polcyn | 280/32.6 X |
| 4,889,352 | 12/1989 | Chamberlin, Jr. et al. | 280/30 X |
| 5,213,447 | 5/1993 | Srock | 114/267 X |

Primary Examiner—Brian L. Johnson
Attorney, Agent, or Firm—Thomas I. Rozsa; Tony D. Chen

[57] ABSTRACT

A portable folding utility carrier, is capable of carrying a maximum load of sixty (60) pounds and used for transporting objects from place to place. The portable folding utility carrier is very similar to that of a suitcase but with wheels attached to the interior surface for easy maneuvering. When the portable folding utility carrier is not utilized, the portable folding utility carrier can be folded and carried around like a suitcase.

23 Claims, 4 Drawing Sheets

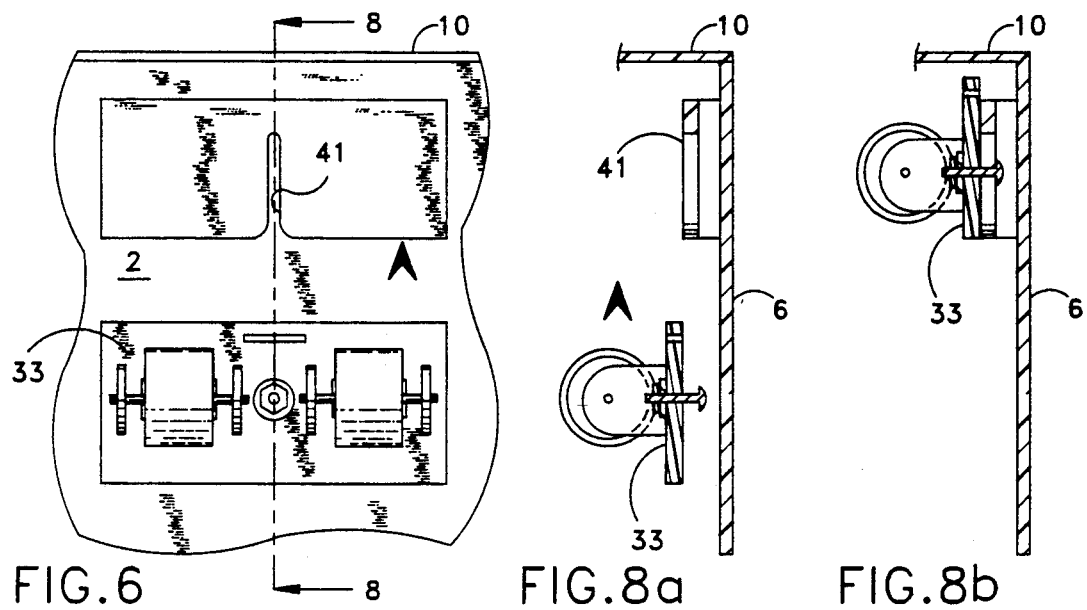
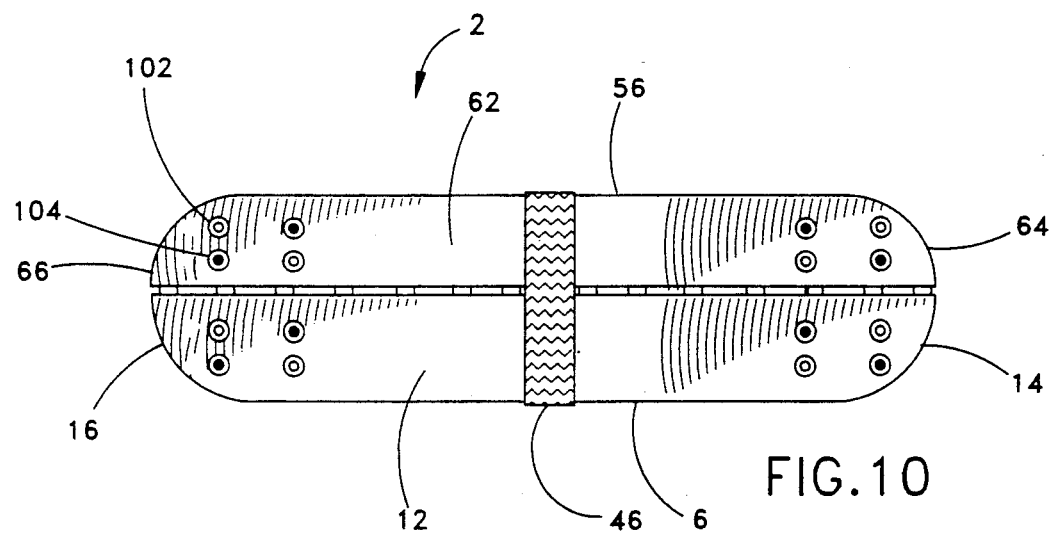
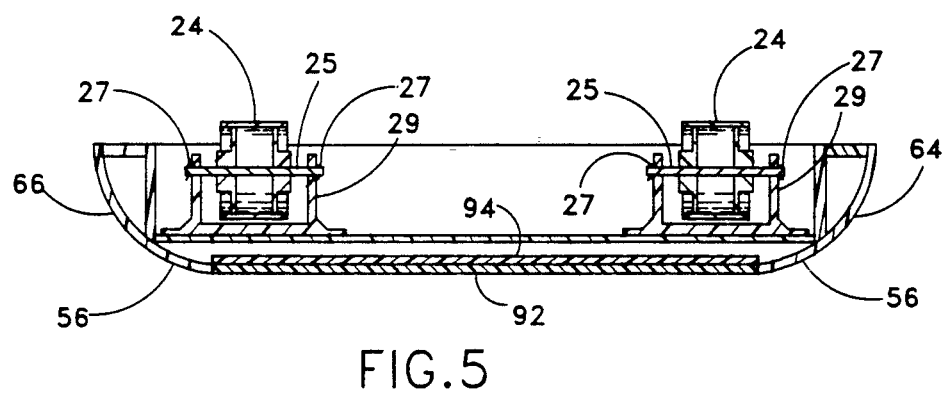

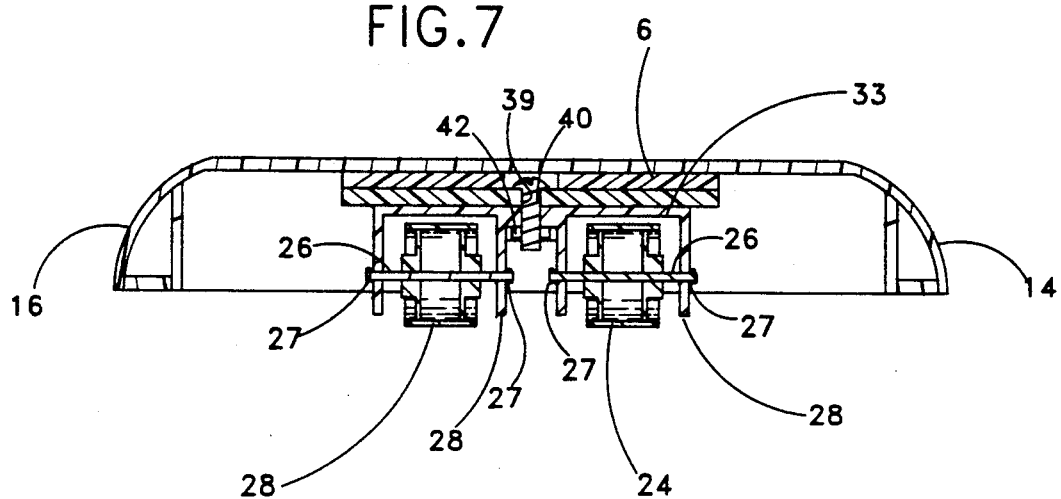
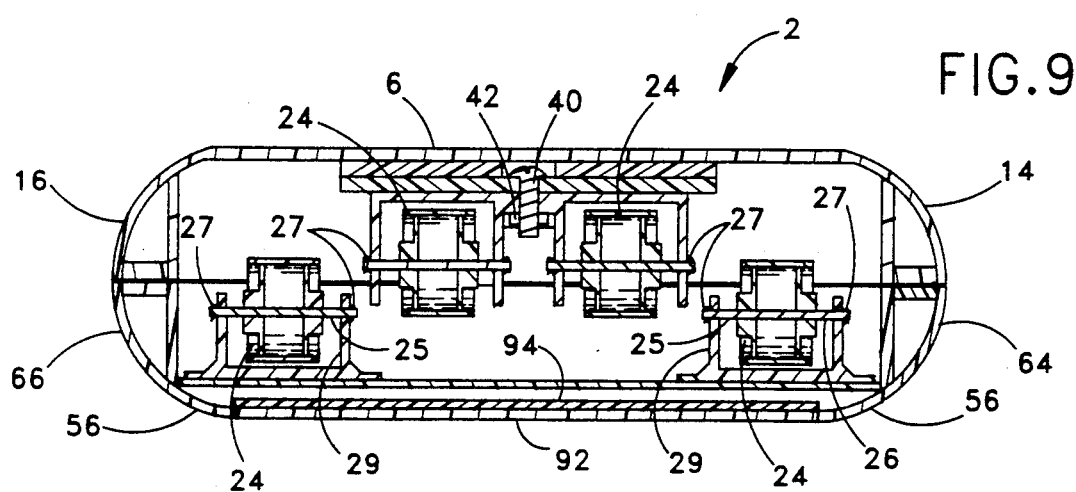
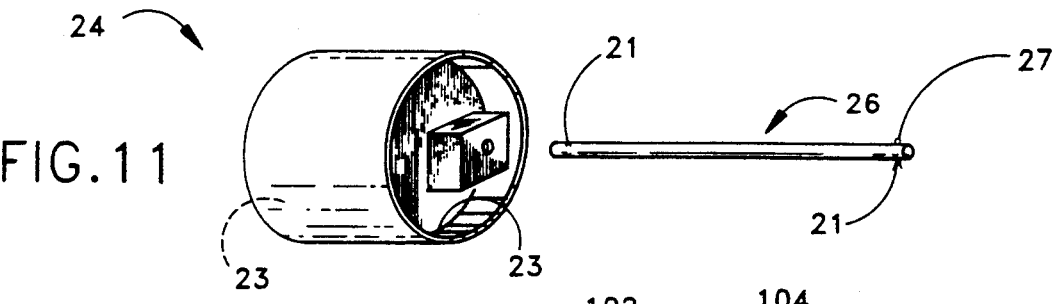
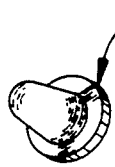
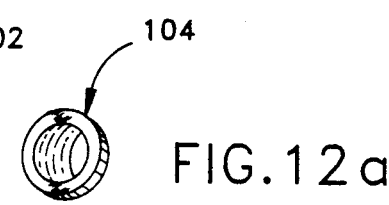

PORTABLE FOLDING UTILITY CARRIER

BACKGROUND OF THE INVENTION

1. Field of the Invention

The present invention relates to the field of dollies. More particularly, the present invention relates to a portable folding utility carrier for comfortably transporting objects from place to place.

2. Description of the Prior Art

In general, there are many types of carriers in today's market. Some devices are used for carrying small items such as books, clothes and other small items from place to place. One example of a carrier is a cart used in airports. The cart is utilized for transporting luggage or other objects around the airport and after checking in the luggage, the cart is no longer needed. After arriving at the destination, one would have to rent the cart again for transporting the luggage to the car or taxicab. This is very time consuming because sometimes there is no cart available.

The cart is also utilized for carrying groceries around in the supermarket. There are other situations where the cart can be utilized. For example, people utilize it for carrying groceries back home after completing shopping at the supermarket. Usually, supermarkets prohibit the shopper from taking the cart home with them. Another example is that people utilize the cart for carrying dirty laundry to the LAUNDROMAT. Another example of a carrier is a dolly used for carrying heavy objects, such as a refrigerator. One disadvantage with these types of devices is that they are not portable. The dolly is portable but the person using the dolly cannot take it onto a plane. Another disadvantage is that they are limited in the amount of objects they can transport because of the constraining structure.

It will be desirable to have a way to comfortably transport luggage or other objects to beaches, parks, picnics, hunting trips, airports, job sites and sporting events.

SUMMARY OF THE INVENTION

The present invention is a novel and unique portable folding utility carrier. The present invention is shaped similar to a suitcase. The primary object of the present invention is to provide a portable carrier for transporting objects from place to place. There are many situations where the present invention can be utilized. It can be utilized at beaches, parks, picnics, hunting trips, airports, job sites and sporting events. One use of the present invention is at the airport. In current practice, the traveller usually rents a cart at the airport for transporting the luggage to the check-in terminal. After arriving at the destination, the traveller would have to rent the cart again to carry his or her belongings to the car or taxicab. The present invention eliminates the need for renting a cart at the airport because the portable folding utility carrier can be sent with the luggage onto the airplane and reclaimed and reassembled by unfolding the portable folding utility carrier when picking up the luggage from the baggage claim carousel at the airport.

Another use of the present invention is at the beach. In current practice, the person usually makes several trips to the car for transporting an ice chest, beach chairs, an umbrella and other miscellaneous items onto the beach. By utilizing the present invention, one would place all the objects on the top surface of the portable folding utility carrier and tie it down with bungee cords and pull it along the street.

The present invention is a portable folding utility carrier which can carry a maximum load of sixty (60) pounds. It can carry more weight but the recommended capacity is sixty (60) pounds. It is made of 3 mm poly plastic material and is lightweight. The construction of the portable folding utility carrier consists of five constituent parts. The first part is a hollow shell with two halves. The second part is a solid front wheel assembly with two front wheels. The third part consists of two rear wheel assemblies wherein each wheel assembly is integrally molded onto one of the respective halves. The fourth part is a foldable back support for supporting one's back when sitting on the portable folding utility carrier. The fifth part is a handle member integrally molded onto the distal end of one of the respective halves of the portable folding utility carrier.

The portable folding utility carrier is unfolded when in use. The hollow structure of the frame is an aerodynamic design. The luggage or other type of objects are placed on the top surface of the portable folding utility carrier and such objects are tied down to the carrier by bungee cords. The present invention can be manufactured in various colors and because of the various color designs, the present invention can be utilized in many situations.

It has been discovered, according to the present invention, that if the folding utility carrier is hollow, it will provide a floating device which can also be used as a life preserver.

It has also been discovered, according to the present invention, that if the utility carrier is made foldable, it will provide a way to carry the device onto airplanes and other locations, for being placed in the trunk of a vehicle, and also for easy storage.

It has additionally been discovered, according to the present invention, that by utilizing wheels on the utility carrier, it will provide an easy way for transporting objects from place to place.

It has further been discovered, according to the present invention, that by fashioning a foldable back support similar to a reclining beach chair, the utility carrier can be utilized as a reclining beach chair.

It is therefore an object of the present invention to provide a portable folding utility carrier which has a hollow shell, so that it can be used as a floating device or a life preserver.

It is also an object of the present invention to provide a portable utility carrier that is foldable, so that it can be carried around as a suitcase and also can be easily stored.

It is an additional object of the present invention to provide wheels for the portable folding utility carrier, so that it can transport objects easily from place to place.

It is a further object of the present invention to provide a portable folding utility carrier that has a foldable back support similar to a reclining beach chair, so that it be used as a reclining chair.

Further novel features and other objects of the present invention will become apparent from the following detailed description, discussion and the appended claims, taken in conjunction with the drawings.

BRIEF DESCRIPTION OF THE DRAWINGS

Referring particularly to the drawings for the purpose of illustration only and not limitation, there is illustrated:

FIG. 5 is a cross-sectional view of the present invention portable folding utility carrier showing the two rear wheel assemblies, taken along 5—5 of FIG. 3.

FIG. 6 is a bottom view of the present invention portable folding utility carrier showing the front steering wheel assembly sliding into the slot mounting.

FIG. 7 is a cross-sectional view of the present invention portable folding utility carrier showing the front steering wheel assembly, taken along 7—7 of FIG. 3.

FIG. 8a is a cross-sectional view of the front wheel assembly detached from the mounting slot, taken along 8—8 of FIG. 6.

FIG. 8b is a cross-sectional view of the front wheel assembly mounted to the mounting slot, taken along 8—8 of FIG. 6.

FIG. 9 is a cross-sectional view of the present invention portable folding utility carrier showing the front steering wheel assembly and the two rear wheel assemblies in its folded condition, taken along 9—9 of FIG. 1.

FIG. 10 is a rear view of the present invention portable folding utility carrier in its folded condition.

FIG. 11 is a perspective view of the wheel and rod attachment.

FIG. 12a is a perspective view of the male rubber feet.

FIG. 12b is a perspective view of the female rubber feet.

DESCRIPTION OF THE PREFERRED EMBODIMENT

Although specific embodiments of the present invention will now be described with reference to the drawings, it should be understood that such embodiments are by way of example only and merely illustrative of but a small number of the many possible specific embodiments which can represent applications of the principles of the present invention. Various changes and modifications obvious to one skilled in the art to which the present invention pertains are deemed to be within the spirit, scope and contemplation of the present invention as further defined in the appended claims.

Figure 1:
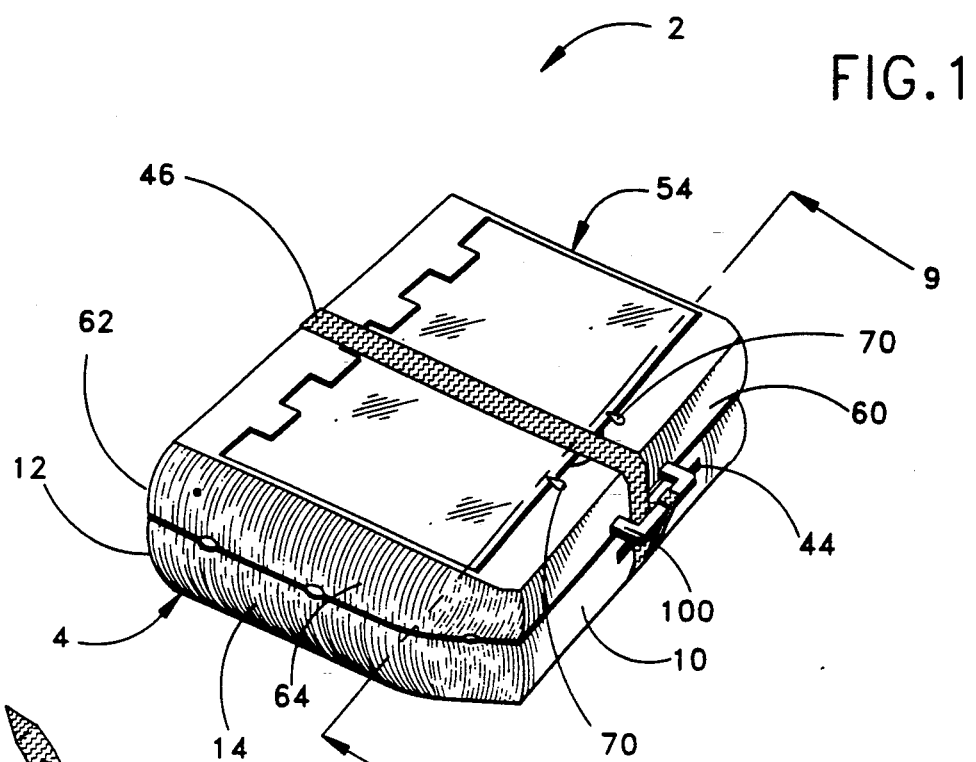
FIG. 1 is a perspective view of the present invention portable folding utility carrier in its folded condition.
Figure 2:
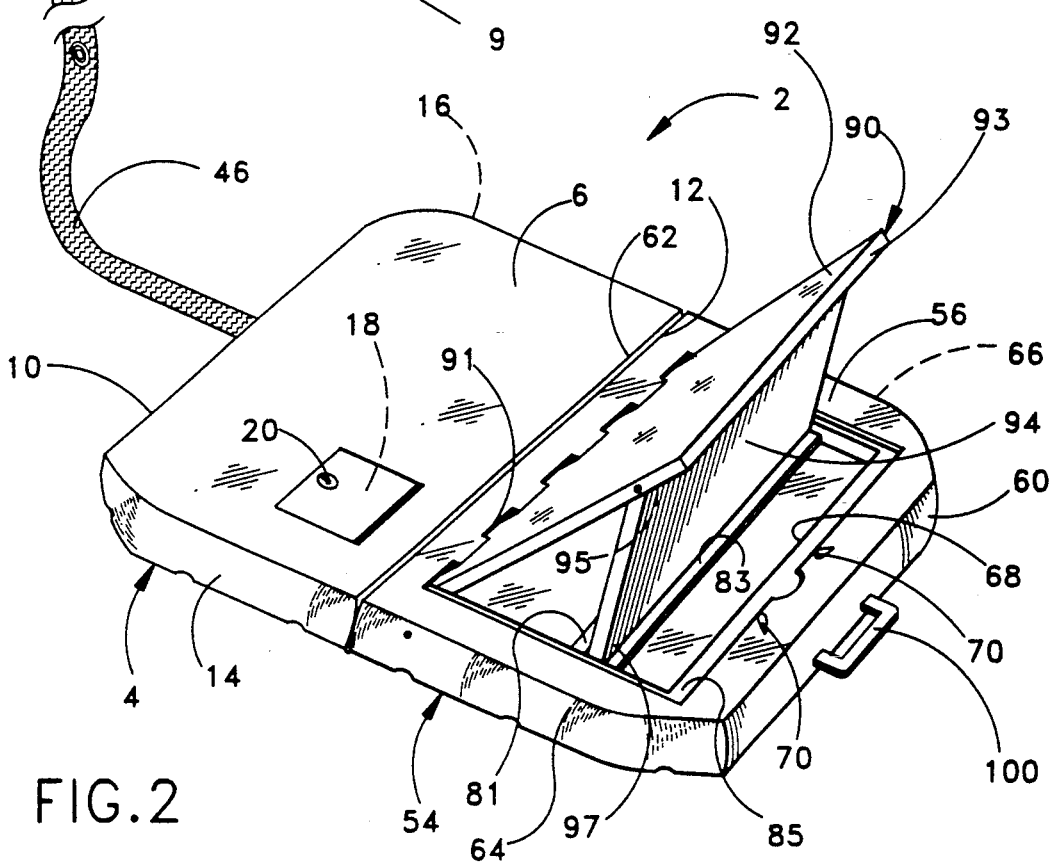
FIG. 2 is a top perspective view of the present invention portable folding utility carrier in its unfolded condition with the foldable back support raised upward.

Referring to FIGS. 1 and 2, there is shown at 2 a portable folding utility carrier apparatus for transporting objects. It is a foldable hollow shell comprised of two halves 4 and 54. The portable folding utility carrier 2 is very similar to that of a suitcase but with wheels attached to the interior surfaces of the two halves for wheeling objects around. In the preferred embodiment of the present invention, the portable folding utility carrier apparatus comprises a first half 4, a second half 54, a foldable back support 90, a front steering wheel assembly, two rear wheel assemblies, a leash or tether member 46 and a handle member 100. The proximal end 12 of the first half 4 is hingeably attached to the proximal end 62 of the second half 54 to form the portable utility carrier apparatus 2.

The portable folding utility carrier 2 can be made from several materials. The present invention is preferably made out of 3 mm poly plastic material. A manufacturing process which could accommodate the construction of the portable folding utility carrier 2 is an injection, thermoform, etc. molding process. The two halves 4 and 54 can be made separately or in a onepiece injection, thermoform, etc. molding process. Several types of color designs can be configured to accommodate the various types of activities for a user utilizing the portable folding utility carrier 2. The molding and mass production process would enable the portable folding utility carrier 2 to be produced inexpensively, thereby making the present invention available to the consumer at a low cost.

Figure 3:
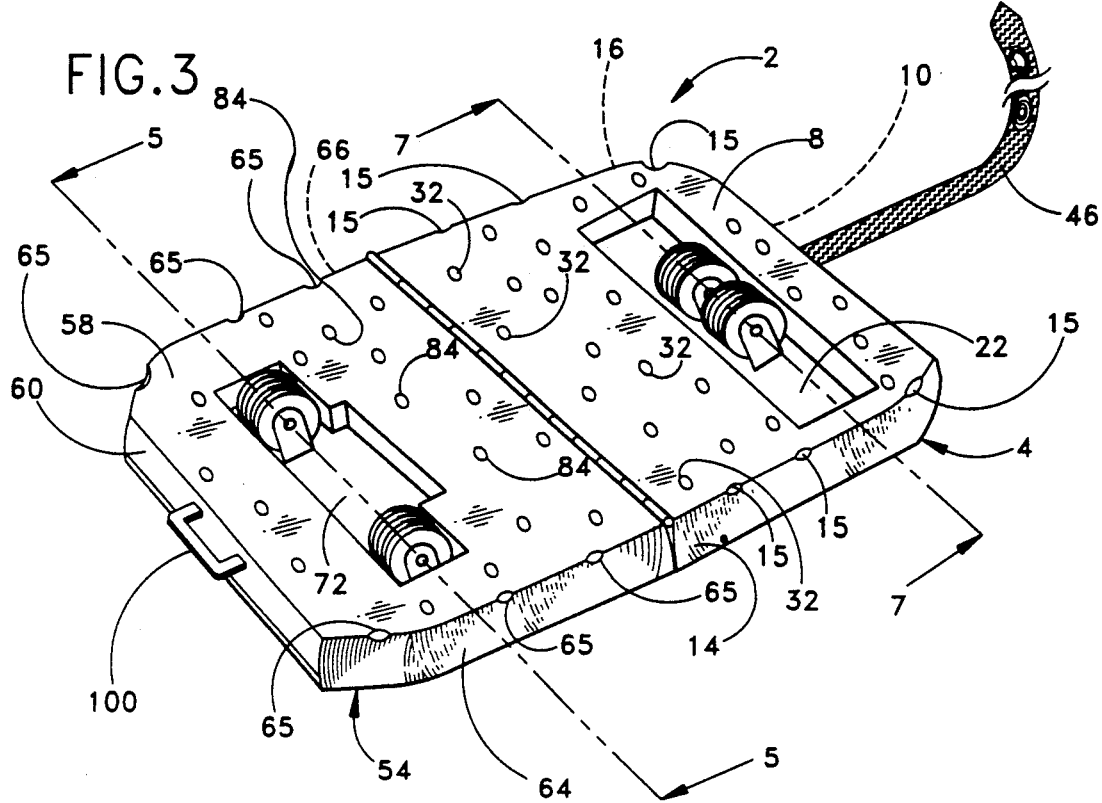
FIG. 3 is a bottom perspective view of the present invention portable folding utility carrier in its unfolded condition with the interior surfaces showing.

Referring to FIGS. 2 and 3, the first half 4 comprises an exterior surface 6, an interior surface 8, a distal end 10, a proximal end 12, two opposite sidewalls includes a first sidewall 14 and a second sidewall 16. Each sidewall comprises three small holes 15 equally spaced from each other. The small holes 15 substantially are located at the intersection of interior surface 8 and a respective one of the two opposite sidewalls 14 and 16. Each small hole 15 is for accommodating a hook means from a bungee cord. The bungee cord is utilized for tying down objects on the exterior surfaces 6 and 56 of the utility carrier 2.

Similarly, the second half 54 comprises an exterior surface 56, an interior surface 58, a distal end 60, a proximal end 62, two opposite sidewalls including a first sidewall 64 and a second sidewall 66. Each sidewall comprises three small holes 65 substantially equally spaced from each other. The three small holes 65 are located at the intersection of interior surface 58 and a respective one of the two opposite sidewalls 64 and 66. Each small hole 65 is for accommodating a hook means from the bungee cord.

It is emphasized that while the present invention has three small holes on each sidewall of the portable folding utility carrier 2 for accommodating a hook means from the bungee cord, it is also within the spirit and scope of the present invention to have a multiplicity of small holes incorporated into the portable folding utility carrier 2 for accommodating a multiplicity of bungee cords.

Referring now to FIG. 2, an interior compartment 18 is located adjacent to the proximal end 12 and the first sidewall 14 of the first half 4 and is accessible from the exterior surface 6 of the first half 4. A locking means 20 is provided for locking valuables, such as a wallet inside the interior compartment 18. By way of example, the interior compartment 18 is approximately 5.0 inches in length, 5.0 inches in width and 1.5 inches in-depth respectively. It will be appreciated that these dimensions are merely one illustrative embodiment and can include many other comparable sets of dimensions.

Referring to FIG. 3, there is shown the interior surfaces of the present invention portable folding utility carrier apparatus 2. The interior surface 8 of the first half 4 comprises a cavity 22 located adjacent to the distal end 10 and a multiplicity of round air pockets or hollow openings 32. The multiplicity of round air pockets or hollow cavities 32 are utilized for making the portable folding utility carrier 2 float in water. The multiplicity of round air pockets or hollow cavities 32 are located on the interior surface 8 of the first half 4.

Similarly, the interior surface 58 of the second half 54 comprises a cavity 72 which is located adjacent to the distal end 60 and a multiplicity of round air pockets or hollow cavities 84. The multiplicity of round air pockets or hollow cavities 84 are utilized for making the portable folding utility carrier 2 float in water. The multiplicity of round air pockets or hollow cavities 84 are located on the interior surface 58 of the second half 54.

There is no particular way the round air pockets are located on both the interior surfaces 8 and 58. They are arbitrarily placed on both the interior surfaces 8 and 58 of the portable folding utility carrier 2. By utilizing the multiplicity of round air pockets or hollow cavities 32 and 84, the portable folding utility carrier 2 can be used as a life preserver. By way of example, the multiplicity of round air pockets 32 and 84 are approximately 1.5 inches in diameter and 1.5 inches in-depth respectively. It will be appreciated that these dimensions are merely one illustrative embodiment and can include many other comparable sets of dimensions, shapes and sizes.

Figure 4:
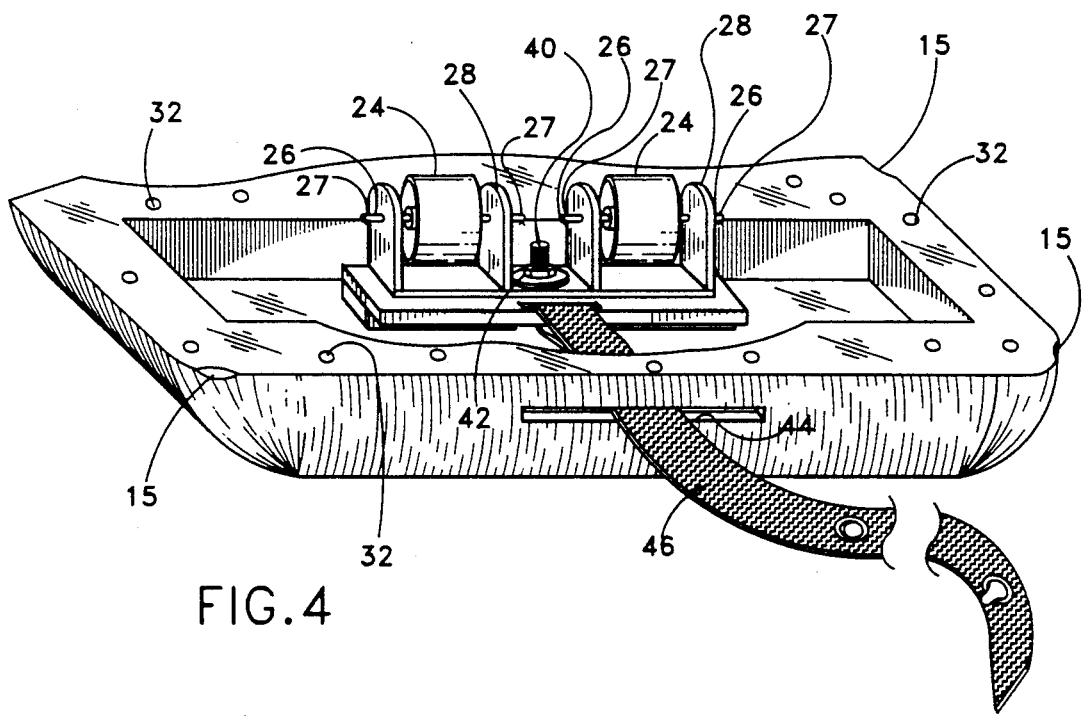
FIG. 4 is a perspective view of the present invention portable folding utility carrier showing the front steering wheel assembly.

Referring to FIGS. 4, 6, 7, 8a, 8b and 9, the front steering wheel assembly comprises two front wheels 24, two mounting brackets 28 and two rod attachments 26. The two front wheels 24 are mounted to the two brackets 28 and secured by the two rod attachments 26. The front steering wheel assembly is further comprised of a steering support 33. The two brackets 28 are affixed to the steering support 33. A central hole is located between the two brackets 28 for retaining the front steering wheel assembly inside the cavity 22. The front steering wheel assembly is placed inside the cavity 22 and is attached by a bolt 40 extending through the central hole 39 of the front steering wheel assembly. The bolt 40 is slid into a slot means 41 and the front steering wheel assembly is secured in the slot 41 by a nut 42, as shown in FIGS. 6, 8a and 8b. The leash or tether member 46 includes a first end and a second end. The first end is attached to the front steering wheel assembly and is slipped through a narrow slot 44 located on the distal end 10 of the first half 4, as shown in FIG. 4. The second end of the leash or tether member 46 has a snap-on type fastener or filamentary hook and loop type fasteners sold under the trademark VELCRO for retaining the first half 4 and the second half 54 together, in the folded condition. The leash or tether 46 is also utilized for pulling the portable folding utility carrier 2 around.

Referring again to FIG. 2, the exterior surface 56 of the second half 54 comprises a recessed shelf 68 within the second half 54 of the portable folding utility carrier 2. The recessed shelf 68 is used to retain a foldable back support 90. The foldable back support 90 comprises two panels 92 and 94. The foldable back support 90 lies flush with the exterior surface 56 of the second half 54, when the foldable back support 90 is placed in the recessed shelf 68. The bottom edge 91 of the first panel 92 is hingeably attached to the sidewalls of the second half 54 at a location adjacent to the proximal end 62 of the second half 54. The top edge 95 of the second panel 94 is hingeably attached and adjacent to the top edge 93 of the first panel 92. The foldable back support 90 is retained within the recessed shelf 68 by two latching means 70 which are attached to the exterior surface 56 and located adjacent to the distal end 60 of the second half 54. The foldable back support 90 can be secured into any one of three reclining positions 81, 83 and 85 by changing the location of the free bottom edge 97 of the second panel 94 to locations 81, 83 and 85. The position shown in the drawings is in the second reclining position 83.

Referring to FIGS. 5 and 9, the two rear wheel assemblies comprise two wheels 24, two brackets 29 and two rod attachments 25. Each wheel is attached to a bracket 29 and is secured in placed by the rod attachment 25. The brackets 29 are integrally molded inside the cavity 72 at two opposite locations adjacent to the distal end 60 and the two opposite sidewalls 64 and 66 respectively. The handle member 100 is also integrally molded to the distal end 60 of the second half 54.

Referring to FIG. 9, there is shown the arrangement of the front steering wheel assembly and the two rear wheel assemblies. When the portable utility carrier 2 is in the folded condition as shown, the two rear wheel assemblies are adequately spaced from each other for the front steering wheel assembly to be stored between the two rear wheel assemblies inside the cavity 72. Similarly, the two rear wheel assemblies are stored inside the cavity 22 that the first half provides. The cavities allow the front wheel assembly and the two rear wheel assemblies to be stored inside the portable folding utility carrier 2 and the two interior surfaces to lie flush against each other.

In operation, when the portable folding utility carrier apparatus 2 is not used, the foldable hollow shell can be folded at the proximal end 10 of the first half 4 towards and in parallel with the proximal end 60 of the second half 54 and is retained together by the leash or tether 46. The leash or tether 46 is wrapped around both halves of the portable folding utility carrier 2 and is snapped together by the fasteners at one end of the leash or tether 46. When the portable folding utility carrier apparatus 2 is to be used, the foldable hollow shell can be unfolded at the proximal end 10 of the first half 4 away from and in coaxial alignment with the proximal end 60 of the second half 54. The two interior surfaces 8 and 58 will be adjacent to the ground and the two exterior surfaces 6 and 56 will be parallel to the ground and used to transport objects from place to place. The front wheel assembly and the two rear wheel assemblies will be in contact with the ground.

Referring to FIG. 11, there is shown a wheel 24 and a rod attachment 26. The wheel 24 is also made out of 3 mm poly plastic material and the rod attachment 26 is made out of metal material or 3 mm poly plastic material. The wheel 24 has a hollow opening 23 at opposite sides for mud or dirt to slide out when the wheel 24 is rotating. The rod attachment 26 has an aperture 21 at each end of the rod attachment 26 for accommodating a clip 27 for retaining the rod 26 in place.

Referring to FIGS. 10, 12a and 12b, there is shown a male rubber foot 102 and a female rubber foot 104. The male 102 and female 104 rubber feet are attached to each respective proximal end of the portable folding utility carrier 2, which includes four male and female rubber feet, and located adjacent to the two opposite sidewalls of the first 4 and second 54 halves of the portable utility carrier 2 respectively. These feet are utilized for preventing the two proximal ends 12 and 62 from sliding around. When the portable utility carrier 2 is unfolded, the male and female rubber feet of the proximal end 12 of the first half 4 mate with the male and female rubber feet of the proximal end 62 of the second half 54. Both surfaces of the proximal end are flat against each other, so that there will not be a gap between the two surfaces when the portable folding utility carrier 2 is unfolded.

Many objects, such as beach blankets, a cooler, umbrella and etc. can be placed on the top surface for transportation.

Defined in detail, the present invention is a portable folding utility carrier apparatus for transporting objects, comprising: (a) a foldable hollow shell having a first half and a second half, each half having an interior surface, an exterior surface, a distal end, a proximal end, a first sidewall and a second sidewall; (b) means for hingeably attaching said proximal end of said first half to said proximal end of said second half; (c) said interior surfaces of said first and second halves each having a cavity located adjacent to said respective distal end; (d) a front steering wheel assembly having two front wheels supported on a steering support; (e) means for mounting said steering support inside said cavity of said first half, such that said steering support can be steered freely and said two front wheels are extended partially beyond said interior surface of said first half; (f) a leash attached to said front steering wheel assembly for pulling said portable utility carrier; (g) said exterior surface of said second half having a recess shelf for placing a foldable back support; (h) said foldable back support having a first panel and a second panel, each having a top edge and a bottom edge; (i) means for hingeably attaching said bottom edge of said first panel to said first and second sidewalls of said second half located adjacent to said proximal end of said second half; (j) means for hingeably attaching said top edge of said second panel to said first panel at a location adjacent to said top edge of said first panel, such that said bottom edge of said second panel is movable; (k) means for retaining said foldable back support in said recess shelf of said exterior surface of said second half; (l) a first rear wheel assembly and a second rear wheel assembly, each supported by a supporting bracket; (m) said first and second rear wheel assemblies integrally molded inside said cavity of said interior surface of said second half at spaced apart locations adjacent to said distal end of said second half, such that each supporting bracket is secured inside said cavity of said second half and said first and second wheel assemblies are extended partially beyond said interior surface of said second half; and (n) a handle member integrally attached to said distal end of said second half for carrying said portable utility carrier; (o) whereby when said portable folding utility carrier apparatus is not used, said foldable hollow shell can be folded by closing said distal end of said first half towards and in parallel with said distal end of said second half and retained together by said leash, and when said portable folding utility carrier apparatus is to be used, said foldable hollow shell can be unfolded by opening said distal end of said first half away from and in coaxial alignment with said distal end of said second half.

Defined broadly, the present invention is a portable utility carrier apparatus which is utilized for transporting objects, comprising: (a) a foldable shell having a first half and a second half, each half having an interior surface, an exterior surface, a distal end, a proximal end, two opposite sidewalls; (b) means for hingeably attaching said proximal end of said first half to said proximal end of said second half; (c) said interior surfaces of said first and second halves each having a cavity; (d) means for mounting a front steering wheel assembly inside said cavity of said interior surface of said first half, such that the front steering wheel assembly can be steered freely and extends partially beyond said interior surface of said first half; (e) said exterior surface of said second half having an opening for placing a back support, the back support having at least two panels, each having a top end and a bottom end; (f) means for hingeably attaching said bottom end of one of said at least two panels to said two opposite sidewalls of said second half at a location adjacent to said proximal end of said second half; (g) means for hingeably attaching said top ends of said at least two panels; and (h) at least two rear wheel assemblies integrally attached inside said cavity of said interior surface of said second half at spaced apart locations, such that the at least two rear wheel assemblies are secured inside said cavity of said second half and extend partially beyond said interior surface of said second half; (i) whereby when said portable utility carrier apparatus is not used, said foldable shell can be folded by closing said distal end of said first half towards and in parallel with said distal end of said second half, and when said portable utility carrier apparatus is to be used, said foldable shell can be unfolded by opening said distal end of said first half away from and in coaxial alignment with said distal end of said second half.

Defined more broadly, the present invention is a utility carrier which is utilized for transporting objects, comprising: (a) a foldable shell having a first section and a second section, each having an inner surface, an outer surface, a first end, a second end and two sidewalls; (b) means for hingeably attaching said second end of said first section to said second end of said second section; (c) said inner surface of said first and second sections each having a cavity; (d) means for mounting a front steering wheel assembly inside said cavity of said interior surface of said first section, such that the front steering wheel assembly can be guided freely and extends partially beyond said inner surface of said first section; (e) said outer surface of said second section having an opening for placing a back support, the back support having a panel, a top end and a bottom end; (f) means for hingeably attaching said bottom end of said panel to said two sidewalls of said second section at a location adjacent to said second end of said second section; (g) means for supporting said panel of said back support which can be reclined at least two positions; and (h) means for mounting at least two rear wheel assemblies inside said cavity of said inner surface of said second section at spaced apart locations, such that the at least two rear wheel assemblies are secured inside said cavity of said second section and extend partially beyond said inner surface of said second section; (i) whereby when said utility carrier is not in use, said foldable shell can be folded by closing said first end of said first section towards and in parallel with said first end of said second section, and when said utility carrier is to be used, said foldable shell can be unfolded by opening said first end of said first section away from and in coaxial alignment with said first end of said second section.

Of course the present invention is not intended to be restricted to any particular form or arrangement, or any specific embodiment disclosed herein, or any specific use, since the same may be modified in various particulars or relations without departing from the spirit or scope of the claimed invention hereinabove shown and described of which the apparatus shown is intended only for illustration and for disclosure of an operative embodiment and not to show all of the various forms or modification in which the present invention might be embodied or operated.

The present invention has been described in considerable detail in order to comply with the patent laws by providing full public disclosure of at least one of its forms. However, such detailed description is not intended in any way to limit the broad features or principles of the present invention, or the scope of patent monopoly to be granted.

What is claimed is:

1. A portable folding utility carrier apparatus for transporting objects, comprising:
   a. a foldable hollow shell having a first half and a second half, each half having an interior surface, an exterior surface, a distal end, a proximal end, a first sidewall and a second sidewall;
   b. means for hingeably attaching said proximal end of said first half to said proximal end of said second half;
   c. said interior surfaces of said first and second halves each having a cavity at a location adjacent to said respective distal end;
   d. a front steering wheel assembly having two front wheels supported on a steering support;
   e. means for mounting said steering support inside said cavity of said first half, such that said steering support can be steered freely and said two front wheels are extended partially beyond said interior surface of said first half;
   f. a leash attached to said front steering wheel assembly for pulling said portable utility carrier;
   g. said exterior surface of said second half having a recess shelf for placing a foldable back support;
   h. said foldable back support having a first panel and a second panel, each having a top edge and a bottom edge;
   i. means for hingeably attaching said bottom edge of said first panel to said first and second sidewalls of said second half at a location adjacent to said proximal end of said second half;
   j. means for hingeably attaching said top edge of said second panel to said first panel at a location adjacent to said top edge of said first panel, such that said bottom edge of said second panel is movable;
   k. means for retaining said foldable back support in said recess shelf of said exterior surface of said second half;
   l. a first rear wheel assembly and a second rear wheel assembly, each supported by a supporting bracket;
   m. said first and second rear wheel assemblies integrally molded inside said cavity of said interior surface of said second half at spaced apart locations adjacent to said distal end of said second half, such that each supporting bracket is secured inside said cavity of said second half and said first and second wheel assemblies are extended partially beyond said interior surface of said second half; and
   n. a handle member integrally attached to said distal end of said second half for carrying said portable utility carrier;
   o. whereby when said portable folding utility carrier apparatus is not in use, said foldable hollow shell can be folded by closing said distal end of said first half towards and in parallel with said distal end of said second half and retained together by said leash, and when said portable folding utility carrier apparatus is to be used, said foldable hollow shell can be unfolded by opening said distal end of said first half away from and in coaxial alignment with said distal end of said second half.

2. The invention as defined in claim 1 wherein said foldable hollow shell is made of 3 mm poly plastic.

3. The invention as defined in claim 1 further comprising means for supporting said foldable back support in three reclining positions.

4. The invention as defined in claim 1 wherein said means for retaining said foldable back support in said recess shelf of said exterior surface of said second half includes two latch means.

5. The invention as defined in claim 1 wherein said means for mounting said steering support inside said cavity of said first half includes a bolt extending through a central hole of said front steering wheel assembly, and said bolt sliding into a slot means located in said interior surface of said first half, where said steering support is secured by a nut.

6. The invention as defined in claim 1 wherein said exterior surface of said first half contains an interior compartment at a location adjacent to said proximal end and said first sidewall of said first half.

7. The invention as defined in claim 6 further comprising means for locking said interior compartment of said first half.

8. The invention as defined in claim 1 wherein said respective first and second sidewalls of said first and second halves each having three equally spaced small holes for accommodating hook means.

9. The invention as defined in claim 1 further comprising four pairs of male and female rubber feet respectively attached to said proximal ends of said first and second halves and at a location adjacent to said first and second sidewalls of said first and second halves.

10. The invention as defined in claim 1 wherein said leash can be inserted through a narrow slot located at said distal end of said first half.

11. The invention as defined in claim 1 further comprising a multiplicity of air pockets located on said interior surfaces of said first and second halves.

12. A portable utility carrier apparatus which is utilized for transporting objects, comprising:
   a. a foldable shell having a first half and a second half, each half having an interior surface, an exterior surface, a distal end, a proximal end and two opposite sidewalls;
   b. means for hingeably attaching said proximal end of said first half to said proximal end of said second half;
   c. said interior surfaces of said first and second halves each having a cavity;
   d. a front steering wheel assembly mounted inside said cavity of said interior surface of said first half, such that the front steering wheel assembly can be steered freely and extends partially beyond said interior surface of said first half;
   e. means for mounting said front steering wheel assembly including a bolt extending through a central hole of said front steering wheel assembly, and sliding into a slot means located in said interior surface of said first half, where the bolt is secured by a nut;
   f. said exterior surface of said second half having an opening for placing a back support, the back support having at least two panels, each having a top end and a bottom end;
   g. means for hingeably attaching said bottom end of one of said at least two panels to said two opposite sidewalls of said second half at a location adjacent to said proximal end of said second half;

h. means for hingeably attaching said top ends of said at least two panels; and i. at least two rear wheel assemblies integrally attached inside said cavity of said interior surface of said second half at spaced apart locations, such that the at least two rear wheel assemblies are secured inside said cavity of said second half and extend partially beyond said interior surface of said second half;

j. whereby when said portable utility carrier apparatus is not in use, said foldable shell can be folded by closing said distal end of said first half towards and in parallel with said distal end of said second half, and when said portable utility carrier apparatus is to be used, said foldable shell can be unfolded by opening said distal end of said first half away from and in coaxial alignment with said distal end of said second half.

13. The invention as defined in claim 12 wherein said foldable shell is made of poly plastic.

14. The invention as defined in claim 12 further comprising means for supporting said back support in at least three reclining positions.

15. The invention as defined in claim 12 further including means for retaining said back support in said opening of said exterior surface of said second half.

16. The invention as defined in claim 12 further comprising an interior compartment which is located under said exterior surface of said first half.

17. The invention as defined in claim 16 further comprising means for locking said interior compartment of said first half.

18. The invention as defined in claim 12 wherein said respective first and second sidewalls of said first and second halves each have a multiplicity of spaced small holes accommodating a hook means.

19. The invention as defined in claim 12 further comprising a multiplicity of paired male and female rubber feet respectively attached to each of said proximal ends of said first and second halves and at a location adjacent to said opposite sidewalls of said first and second halves.

20. The invention as defined in claim 12 further comprising a tether which is inserted through a narrow slot located at said distal end of said first half and connected to said front steering wheel assembly for pulling said portable utility carrier apparatus.

21. The invention as defined in claim 12 further comprising a handle member attached to said distal end of said second half for carrying said portable utility carrier.

22. The invention as defined in claim 12 further comprising means for retaining said portable utility carrier apparatus in a folded position.

23. The invention as defined in claim 12 further comprising a multiplicity of air pockets on said interior surfaces of said first and second halves.

* * * * *